United States Patent
Byoun (10) Patent No.: US 10,504,553 B1
(45) Date of Patent: Dec. 10, 2019

(54) DATA STORAGE DEVICE TRANSMITTING DELTA SERVO CONTROL VALUE OVER SERIAL INTERFACE

(71) Applicant: Western Digital Technologies, Inc., San Jose, CA (US)

(72) Inventor: Jaesoo Byoun, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/359,747

(22) Filed: Mar. 20, 2019

(51) Int. Cl.
  *G11B 5/09* (2006.01)
  *G11B 21/10* (2006.01)
  *G11B 5/012* (2006.01)

(52) U.S. Cl.
  CPC ............ *G11B 21/106* (2013.01); *G11B 5/012* (2013.01)

(58) Field of Classification Search
  CPC ..... G11B 5/00; G11B 20/10009; G11B 27/36; G11B 5/09; G11B 20/10; G11B 5/035; G11B 5/54
  USPC ..................................................... 360/39, 75
  See application file for complete search history.

(56) References Cited

U.S. PATENT DOCUMENTS

| | | | |
|---|---|---|---|
| 5,790,331 A | 8/1998 | Aranovsky | |
| 6,310,740 B1 | 10/2001 | Dunbar et al. | |
| 6,594,094 B2 * | 7/2003 | Rae ......................... | G11B 5/09 360/25 |
| 8,542,455 B2 | 9/2013 | Huang et al. | |
| 10,176,835 B1 | 1/2019 | Byoun et al. | |

* cited by examiner

*Primary Examiner* — Nabil Z Hindi (57) ABSTRACT

A data storage device is disclosed comprising a disk comprising servo data, and an actuator configured to actuate a head radially over the disk. The disk drive further comprises control circuitry comprising a servo controller and a driver circuit comprising an accumulator, wherein the servo controller is configured to generate digital control values based on the servo data and transmit the digital control values over a serial interface to the drive circuit. The accumulator is initialized based on a first digital control value received over the serial interface during a first servo interval, and then the accumulator is adjusted based on a second digital control value received over the serial interface during a second servo interval. An analog control signal is generated based on an output of the accumulator, and the analog control signal is applied to the actuator.

14 Claims, 6 Drawing Sheets

DATA STORAGE DEVICE TRANSMITTING DELTA SERVO CONTROL VALUE OVER SERIAL INTERFACE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
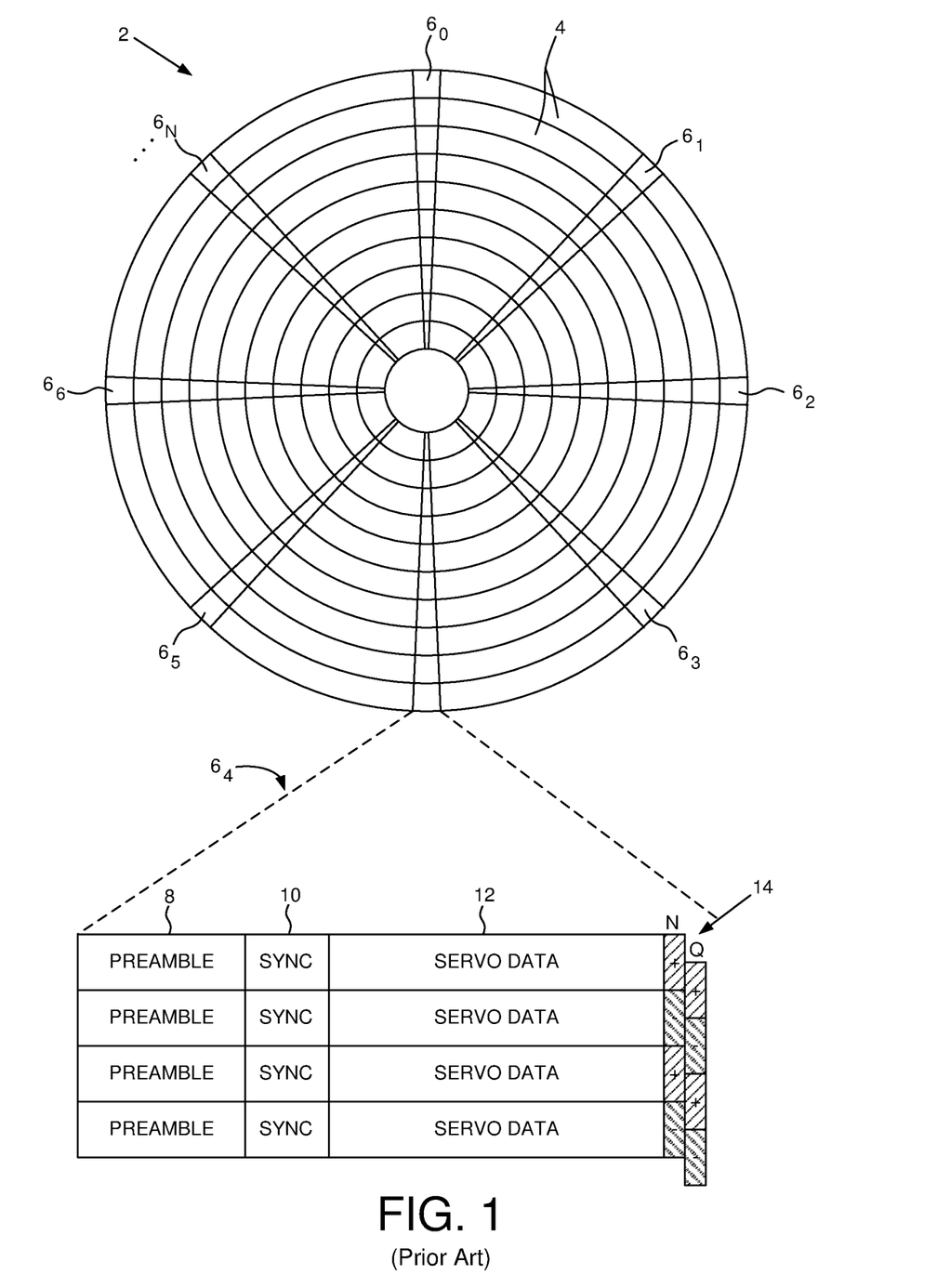
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
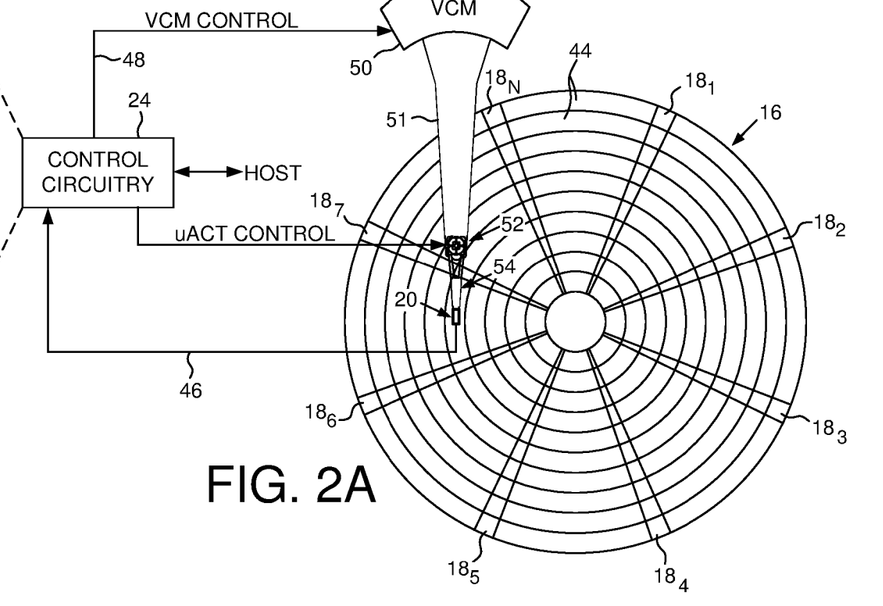
FIG. 2A shows a data storage device according to an embodiment in the form of a disk drive comprising a head actuated radially over a disk by an actuator.
Figure 2B:
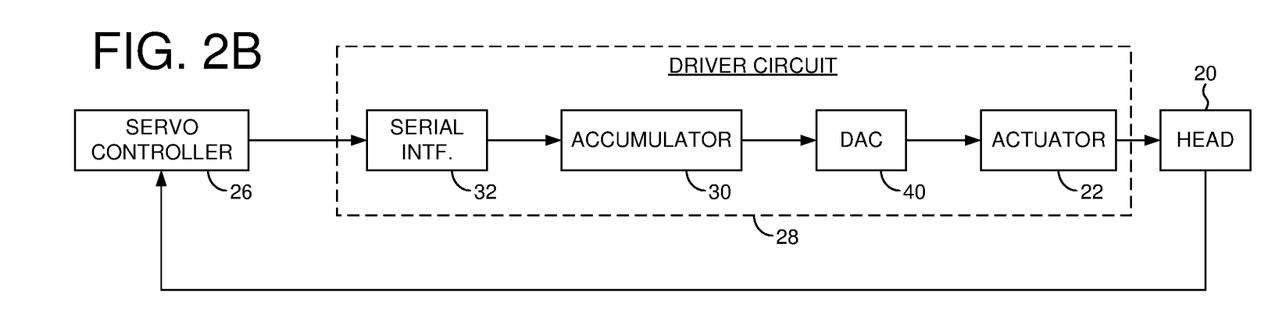
FIG. 2B shows control circuitry according to an embodiment comprising a servo controller for transmitting digital control values over a serial interface to a driver circuit.
Figure 2C:
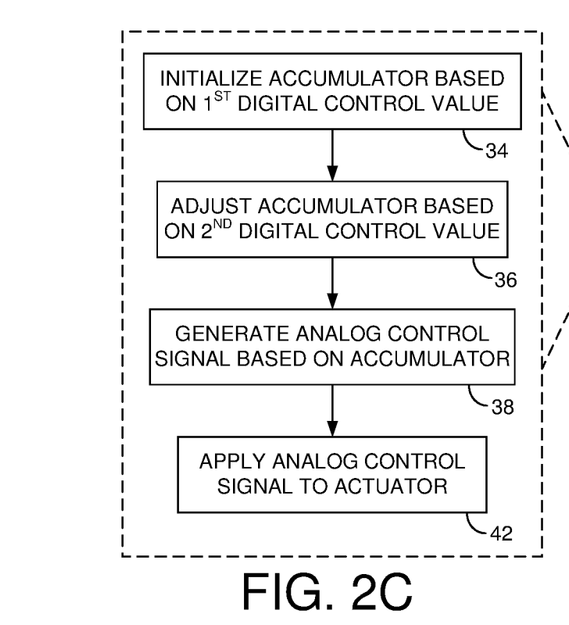
FIG. 2C is a flow diagram according to an embodiment wherein an accumulator in the driver circuit is initialized and then adjusted based on a delta digital control value received over the serial interface.

FIGS. 2A and 2B show a data storage device in the form of a disk drive according to an embodiment comprising a disk 16 comprising servo data $18_1$-$18_N$ and a head 20 actuated radially over the disk 16 by a first actuator 22. The disk drive further comprises control circuitry 24 comprising a servo controller 26 and a driver circuit 28 comprising a first accumulator 30, wherein the servo controller 26 is configured to generate digital control values based on the servo data and transmit the digital control values over a serial interface 32 to the drive circuit 28. In one embodiment, the driver circuit 28 is configured to execute the flow diagram of FIG. 2C, wherein the first accumulator is initialized based on a first digital control value received over the serial interface during a first servo interval (block 34). The first accumulator is then adjusted based on a second digital control value received over the serial interface during a second servo interval (block 36). A first analog control signal is generated by a digital-to-analog converter 40 based on an output of the first accumulator (block 38), and the first analog control signal is applied to the first actuator (block 42).

In the embodiment of FIG. 2A, the disk 18 comprises a plurality of servo sectors $18_1$-$18_N$ that define a plurality of servo tracks, wherein data tracks 44 are defined relative to the servo tracks at the same or different radial density. The control circuitry 24 processes a read signal 46 emanating from the head 20 to demodulate the servo sectors and generate a position error signal (PES) representing an error between the actual position of the head and a target position relative to a target track. A servo control system in the control circuitry 24 filters the PES using a suitable compensation filter to generate a control signal 48 applied to a VCM 50 which rotates an actuator arm 51 about a pivot in order to actuate the head radially over the disk in a direction that reduces the PES. In one embodiment, the head 20 may be actuated over disk 16 based on the PES using one or more secondary actuators, for example, a microactuator 52 that actuates a suspension 54 coupling a head slider to the actuator arm 51, or a microactuator that actuates the head slider relative to the suspension 54 (e.g., using a thermal actuator, piezoelectric actuator, etc.). The servo sectors $18_1$-$18_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the servo controller 26 (which processes the PES to generate the digital control values) is implemented within a first integrated circuit, and the driver circuit 28 is implemented within a second integrated circuit. In order to reduce the cost of the disk drive, the digital control values are transmitted to the driver circuit 28 over a serial interface 32 that may also be used to transmit other configuration data (e.g., spindle motor control data). In one embodiment, the transfer delay of the serial interface 32 adds to the phase delay in the feedback loop of the servo control system that can degrade the servoing performance of the head. In order to mitigate the phase delay induced by the serial interface 32, in one embodiment an initial digital control value is transmitted to the driver circuit 28 during a first servo interval which is then adjusted by a delta digital control value transmitted to the driver circuit 28 during subsequent servo intervals, wherein the delta digital control value comprises fewer bits than the initial digital control value.

Figure 3:
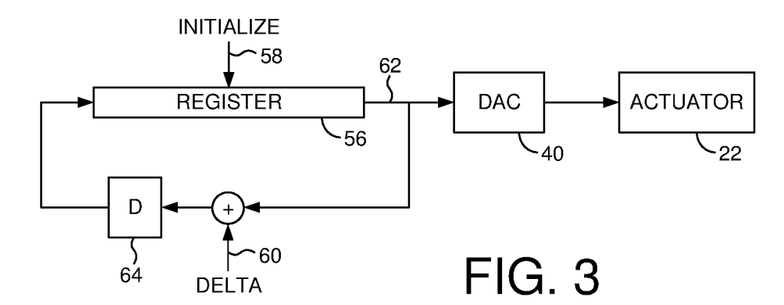
FIG. 3 shows an accumulator according to an embodiment for accumulating the delta digital control values received over the serial interface.
Figure 4A:
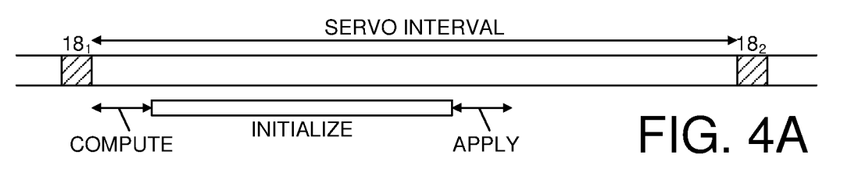
FIGS. 4A-4C show an embodiment wherein during a first servo interval the accumulator is initialized with an initial digital control value, and during subsequent servo intervals the accumulator is adjusted by the delta digital control values.
Figure 4B:
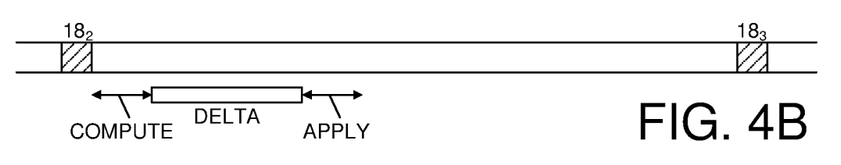
Figure 4C:
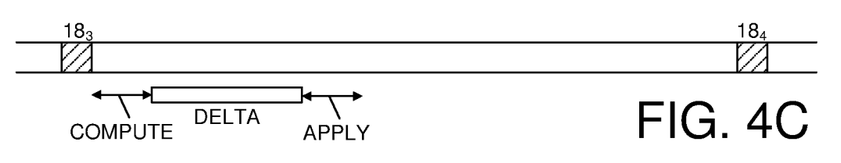

FIG. 3 shows an embodiment of the accumulator 30 of FIG. 2B as comprising a register 56 that is initialized by the initial digital control value 58 received over the serial interface 32 during a first servo interval (FIG. 4A). In one embodiment, the initial digital control value 58 may be generated based on the PES generated from an initial servo sector (e.g., servo sector $18_1$). During a subsequent servo interval as shown in FIG. 4B, a delta digital control value 60 is computed based on the PES generated from the next servo sector (e.g., servo sector $18_2$) which is then transmitted to the driver circuit 28 over the serial interface 32. In this embodiment, the delta digital control value represents the difference between a full digital control value generated based on the current PES and the initial digital control value generated based on the previous PES. That is, the delta digital control value is either a positive value for increasing the initial digital control value or a negative value for decreasing the initial digital control value. In the embodiment of FIG. 3, the delta digital control value 60 is added to the output 62 of the accumulator 20, and the result reloaded into register 56 (by clocking a delay register 64). When the head reaches the next servo sector (e.g., servo sector 183 as shown in FIG. 4C), the servo controller 26 computes the next delta digital control value based on the PES, wherein the delta digital control value corresponds to the adjustment to the current output 62 of the accumulator 20 that achieves a full digital control value corresponding to the current PES. In one embodiment, the servo controller 26 may generate the delta digital control value 60 by computing a difference between the full digital control value computed at a previous servo sector and the full digital control value computed at a current servo sector.

In the embodiment of FIGS. 4A-4C, the initial control value is represented by a first number of bits and the delta digital control value is represented by a second number of bits less than the first number of bits. Accordingly, this embodiment reduces the transfer delay of the serial interface 32 and corresponding phase delay in the feedback loop of the servo control system when transmitting the delta digital control values to the driver circuit 28. In one embodiment, the slew rate of the digital control values for controlling the first actuator 22 is small enough (or limited) during certain operating modes (e.g., when tracking a data track during an access operation) to enable the transfer of a delta digital control value computed for each servo sector. That is, during certain operating modes (e.g., tracking operation) the relatively small PES measured at each servo sector and corresponding analog control signal applied to the actuator 22 means it is unnecessary to transmit a full digital control value to the driver circuit 28 at each servo sector.

A delta digital control value may be computed and transmitted to the driver circuit 28 for any suitable actuator. In one embodiment, a delta digital control value may be accumulated by an accumulator that generates the analog control signal for the VCM 50 of FIG. 2A. For example, in one embodiment during a tracking operation the slew rate of the digital control values computed at each servo sector for the VCM 50 may remain below a threshold to enable the transfer of delta digital control values instead of full digital control values. In one embodiment, during a seek operation to seek the head to a target data track the slew rate of the digital control values may increase (e.g., during an acceleration or deceleration phase of the seek operation) such that a full digital control value may be transmitted to the driver circuit at each servo sector (e.g., the full digital control value may be used to initialize the register 56 of the accumulator shown in FIG. 3 at each servo sector). In one embodiment, during a constant velocity phase of the seek operation the slew rate of the digital control values may fall below a threshold to enable a delta digital control value to be transmitted at each servo sector.

In one embodiment, the size of the delta digital control value (the number of bits) may be configured based on an expected slew rate of the digital control values during different modes of operation. For example, during a tracking operation the slew rate of the digital control values may correspond to a first size limit of the delta digital control values, whereas during a constant velocity phase of a seek operation the slew rate of the digital control values may correspond to a second size limit of the delta digital control values. In one embodiment, if the change in the full digital control value between servo sectors exceeds the size limit of the delta digital control value, the servo controller 26 may re-initialize the accumulator 30 by transmitting the full digital control value over the serial interface 32, and then restart transmitting delta digital control values at subsequent servo sectors.

Figure 5:
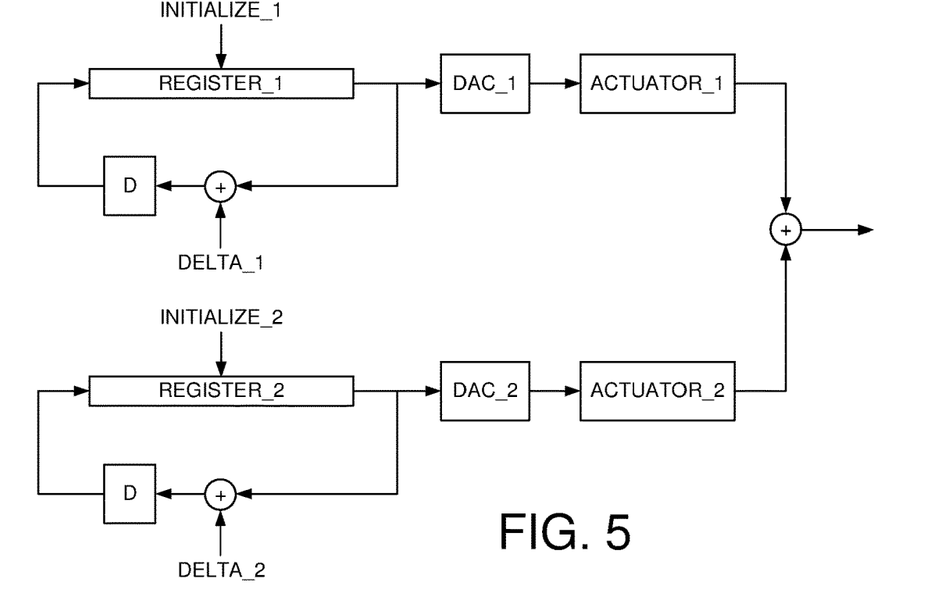
FIG. 5 shows an embodiment wherein the driver circuit comprises first and second accumulators configured to control first and second actuators for actuating the head radially over the disk.
Figure 6A:
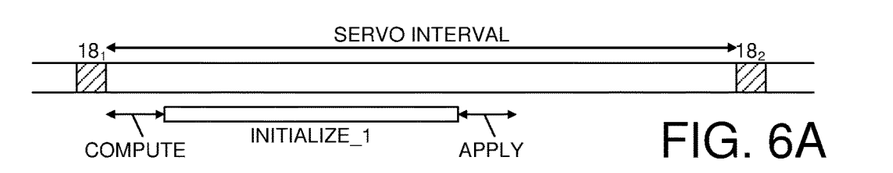
FIGS. 6A-6D show an embodiment wherein the first and second accumulators are initialized and then adjusted by respective delta digital control values received over the serial interface.
Figure 6B:
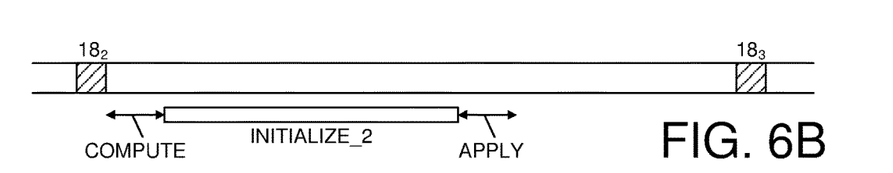
Figure 6C:
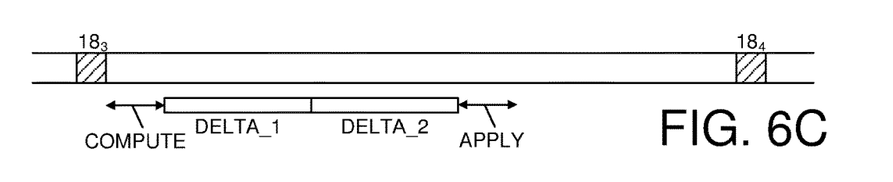
Figure 6D:
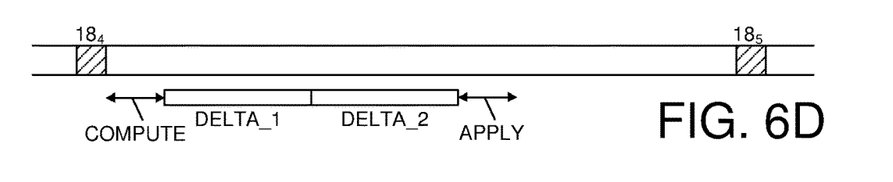

In one embodiment, the actuator 20 of FIG. 2B comprises any suitable microactuator configured to actuate the head 20 radially over the disk 16, such as a microactuator 52 that actuates a suspension 54 coupling a head slider to the actuator arm 51, or a microactuator that actuates the head slider relative to the suspension 54 (e.g., using a thermal actuator, piezoelectric actuator, etc.). In one embodiment, the microactuator exhibits a higher bandwidth than the VCM 50, thereby improving the servoing performance, for example, during a short seek operation and/or during a tracking operation. In one embodiment, the disk drive may employ multiple microactuators exhibiting varying bandwidths and stroke limits. In an embodiment shown in FIG. 5, the driver circuit 28 of FIG. 2B may comprise multiple accumulators each configured to generate an analog control signal for a respective actuator (e.g., a VCM and a microactuator, or two microactuators). As shown in FIG. 5, the effect of each actuator on the radial movement of the head is represented as the combined output of each actuator.

FIGS. 6A-6D show an embodiment wherein during a first servo interval the first accumulator shown in FIG. 5 is initialized with a first initial digital control value, and during the next servo interval the second accumulator is initialized with a second initial digital control value. During the following and subsequent servo intervals, a first and second delta digital control values are computed and transmitted to the driver circuit 28 over the serial interface 32 in order to adjust the respective accumulators. In one embodiment, each actuator servo loop may have a different sensitivity to the phase delay caused by the transfer delay of the serial interface 32. Accordingly in one embodiment, the delta values may be transmitted to the driver circuit during each servo interval in an order corresponding to the phase delay sensitivity. That is, the delta value of the most sensitive actuator servo loop may be transmitted to the driver circuit 28 first and used to update the corresponding accumulator while concurrently receiving the second delta value over the serial interface 32.

Figure 7:
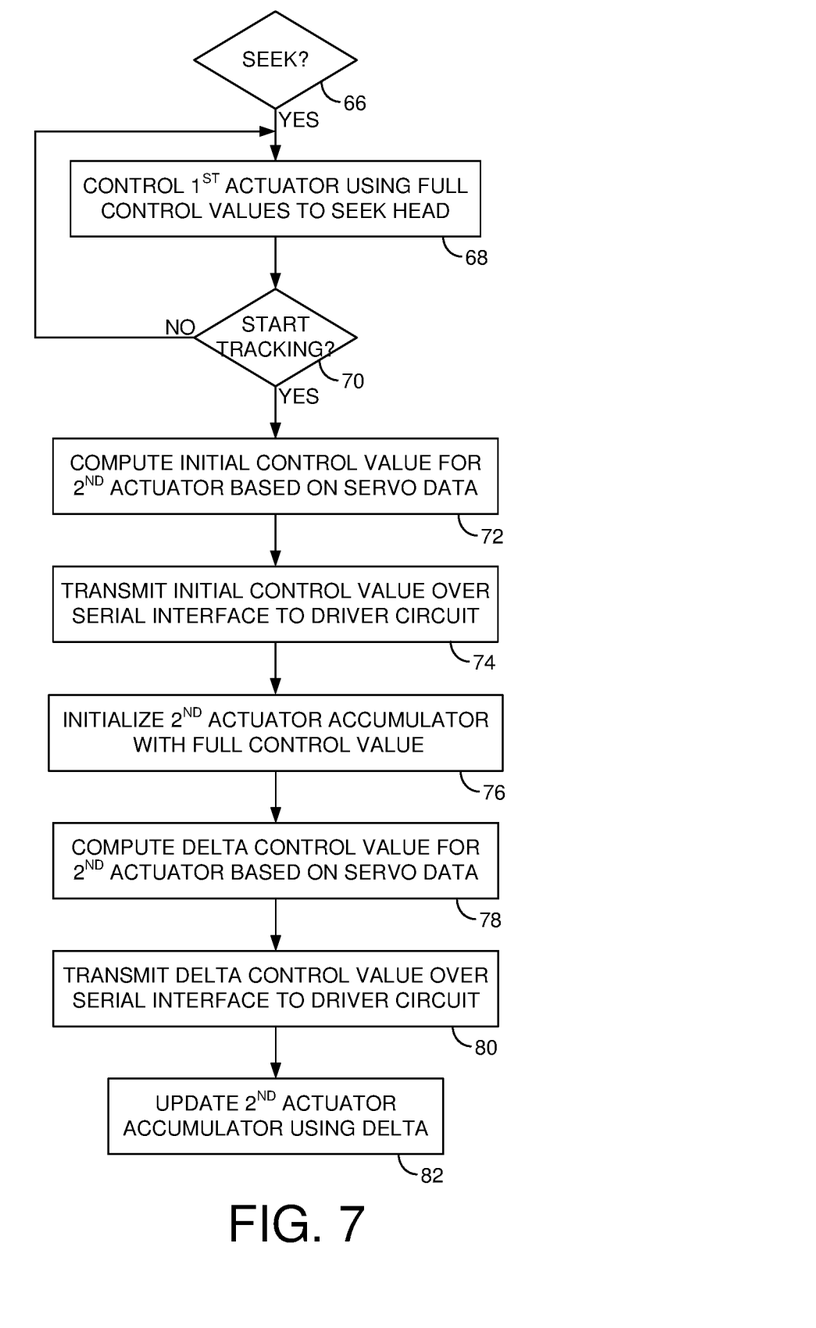
FIG. 7 is a flow diagram according to an embodiment wherein after a seek operation, the accumulator is initialized at the beginning of a tracking operation and then adjusted by a delta digital control value during each servo interval.

FIG. 7 is a flow diagram according to an embodiment wherein when a seek operation is initiated (block 66), a first actuator (e.g., the VCM 50 of FIG. 2A) is controlled by computing and transmitting full digital control values to the driver circuit in order to seek the head toward a target data track (block 68). When the seek operation finishes and the servo system transitions into a tracking operation (block 70), an initial digital control value is computed based on reading a current servo sector (block 72) and transmitted to the driver circuit over the serial interface (block 74). The initial digital control value is used to initialize the accumulator for controlling a second actuator, such as a microactuator (block 76). When the head reaches the next servo sector, a delta digital control value is computed (block 78) and transmitted to the driver circuit over the serial interface (block 80), wherein the delta digital control value is used to update the accumulator for controlling the second actuator as described above (block 82).

Figure 8:
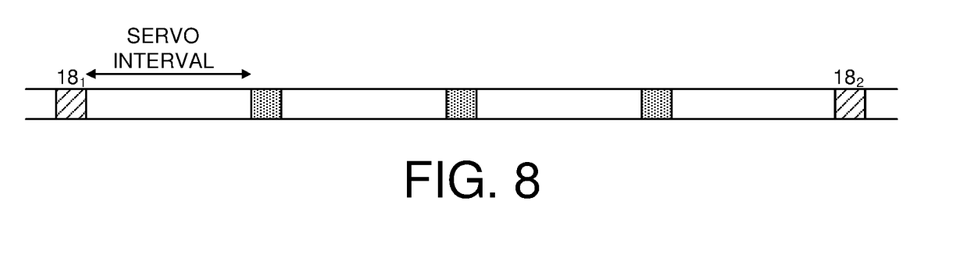
FIG. 8 shows an embodiment wherein the servo system for controlling the actuator(s) may be an upsampled servo system meaning that multiple digital control values may be computed and transmitted to the driver circuit over the serial interface during each servo interval.

In the embodiments described above, a delta digital control value may be computed for each servo sector and transmitted over the serial interface to the driver circuit. In an alternative embodiment, the servo system for controlling the actuator(s) may be an upsampled servo system meaning that multiple digital control values may be computed for each servo sector. FIG. 8 shows an example of this embodiment wherein four digital control values may be computed for each servo sector and transmitted to the driver circuit over the serial interface. For example, after transmitting an initial digital control value used to initialize the accumulator 30 of FIG. 2B, four delta digital control values may be computed and transmitted to the driver circuit over the serial interface during the interval between consecutive servo sectors as shown in FIG. 8, wherein each delta digital control value corresponds to an upsampled servo system. Any suitable technique may be employed to compute the upsampled digital control values, an example of which is disclosed in U.S. Pat. No. 8,542,455 entitled "DISK DRIVE UPSAMPLING SERVO CONTROL SIGNAL" the disclosure of which is incorporated herein by reference.

Figure 9A:
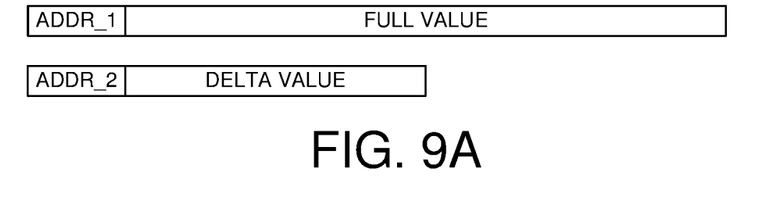
FIG. 9A shows an embodiment wherein different addresses are transmitted to the driver circuit over the serial interface to identify the payload as either a full digital control value or a delta digital control value for a respective actuator.
Figure 9B:
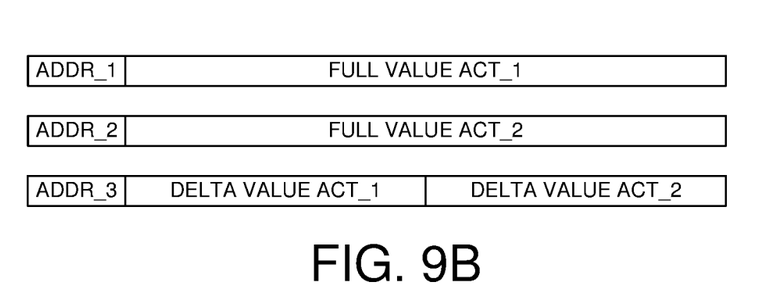
FIG. 9B shows an embodiment wherein different addresses are transmitted to the driver circuit over the serial interface to identify the payload as either a full digital control value for a respective actuator, or a delta digital control value for two actuators.
Figure 9C:
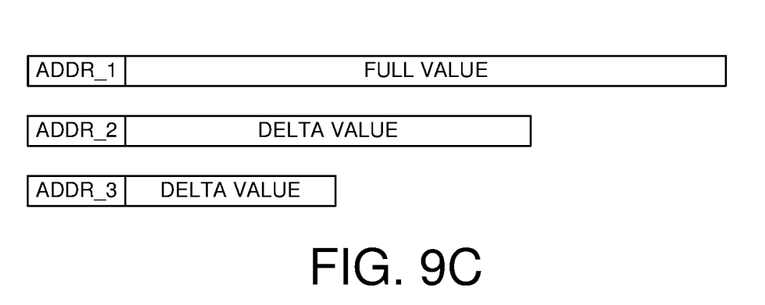
FIG. 9C shows an embodiment wherein different addresses are transmitted to the driver circuit over the serial interface to identify the payload as either a full digital control value, a first length delta digital control value, or a second length delta digital control value for a respective actuator.

FIG. 9A shows an embodiment wherein when the servo controller 26 of FIG. 2B transmits a digital control value to the driver circuit 28 over the serial interface 32, an address value is also transmitted for addressing a corresponding register. For example, the driver circuit 28 may comprise a register for storing the initial digital control value (e.g., register 56 in FIG. 3), and a register for storing the delta digital control value. When the driver circuit 28 receives a transmission over the serial interface 32, the driver circuit 28 evaluates the address field to determine which register to update with the payload of the transmission (e.g., initial or delta value). In an embodiment employing multiple accumulators for controlling multiple actuators such as shown in FIG. 5, there may be first and second addresses corresponding to the initial values for the accumulators, and a third address that may identify a delta value for each accumulator as shown in FIG. 9B. That is, when the driver circuit 28 receives a transmission having the third address shown in FIG. 9B, the driver circuit 28 may use the first part of the transmission payload as the first delta value and the second part of the transmission payload as the second delta value. In an embodiment shown in FIG. 9C, the size of the delta value may vary depending on the operating mode of the disk drive and corresponding slew rate of the digital control values. Accordingly, in this embodiment the size of the transmission payload may vary based on the address received with the payload, wherein a first address may identify a full digital control value (e.g., an initial value), a second address may identify a first length delta digital control value, and a third address may identify a second length delta digital control value.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising servo data;
a head;
a first actuator configured to actuate the head radially over the disk; and
control circuitry comprising a servo controller and a driver circuit comprising a first accumulator, wherein the servo controller is configured to generate digital control values based on the servo data and transmit the digital control values over a serial interface to the drive circuit, wherein the driver circuit is configured to:
initialize the first accumulator based on a first digital control value received over the serial interface during a first servo interval;
adjust the first accumulator based on a second digital control value received over the serial interface during a second servo interval;
generate a first analog control signal based on an output of the first accumulator; and
apply the first analog control signal to the first actuator.

2. The data storage device as recited in claim 1, wherein the first digital control value consists of a first number of bits and the second digital control value consists of a second number of bits less than the first number of bits.

3. The data storage device as recited in claim 2, wherein the driver circuit is further configured to adjust the first accumulator by adding the second digital control value to the first accumulator, wherein:
the output of the first accumulator increases when the second digital control value is a positive value; and
the output of the first accumulator decreases when the second digital control value is a negative value.

4. The data storage device as recited in claim 1, further comprising a second actuator configured to actuate the head radially over the disk, wherein the driver circuit further comprises a second accumulator and the driver circuit is further configured to:
initialize the second accumulator based on a third digital control value received over the serial interface during a third servo interval;
adjust the second accumulator based on a fourth digital control value received over the serial interface during the second servo interval;
generate a second analog control signal based on an output of the second accumulator; and
apply the second analog control signal to the second actuator.

5. The data storage device as recited in claim 4, wherein the third digital control value consists of a first number of bits and the fourth digital control value consists of a second number of bits less than the first number of bits.

6. A data storage device comprising:
a disk comprising servo data;
a head;
a first actuator configured to actuate the head radially over the disk; and
control circuitry configured to:
compute a first initial digital control value based on the servo data;
transmit the first initial digital control value over a serial interface to a driver circuit configured to control the first actuator based on the first initial digital control value;
compute a first delta digital control value based on the servo data, wherein the first delta digital control value for adjusting the first initial digital control value;
transmit the first delta digital control value over the serial interface to the driver circuit, wherein the first initial digital control value consists of a first number of bits and the first delta digital control value consists of a second number of bits less than the first number of bits.

7. The data storage device as recited in claim 6, wherein the first delta digital control value is one of a positive value for increasing the first initial digital control value or a negative value for decreasing the first initial digital control value.

8. The data storage device as recited in claim 6, further comprising a second actuator configured to actuate the head radially over the disk, wherein the control circuitry is further configured to:
compute a second initial digital control value based on the servo data;
transmit the second initial digital control value over the serial interface to the driver circuit, wherein the driver circuit is further configured to control the second actuator based on the second initial digital control value;
compute a second delta digital control value based on the servo data, wherein the second delta digital control value for adjusting the second initial digital control value;
transmit the second delta digital control value over the serial interface to the driver circuit, wherein the second initial digital control value consists of a first number of bits and the second delta digital control value consists of a second number of bits less than the first number of bits.

9. The data storage device as recited in claim 8, wherein the second delta digital control value is one of a positive value for increasing the second initial digital control value or a negative value for decreasing the second initial digital control value.

10. Control circuitry comprising:
a serial interface configured to receive digital control values;
a first accumulator; and
a first digital-to-analog converter configured to generate a first analog control signal for controlling a first actuator based on an output of the first accumulator, wherein the first actuator is configured to actuate a head radially over a disk,
wherein the control circuitry is configured to:
initialize the first accumulator based on a first digital control value received over the serial interface; and
adjust the first accumulator based on a second digital control value received over the serial interface.

11. The control circuitry as recited in claim 10, wherein the first digital control value consists of a first number of bits and the second digital control value consists of a second number of bits less than the first number of bits.

12. The control circuitry as recited in claim 11, wherein the control circuitry is further configured to adjust the first accumulator by accumulating the second digital control value, wherein:
the output of the first accumulator increases when the second digital control value is a positive value; and
the output of the first accumulator decreases when the second digital value is a negative value.

13. The control circuitry as recited in claim 10, further comprising:
a second accumulator; and
a second digital-to-analog converter configured to generate a second analog control signal for controlling a second actuator based on an output of the second accumulator, wherein the second actuator is configured to actuate the head radially over the disk,
wherein the control circuitry is further configured to:
initialize the second accumulator based on a third digital control value received over the serial interface; and
adjust the second accumulator based on a fourth digital control value received over the serial interface.

14. The control circuitry as recited in claim 13, wherein the third digital control value consists of a first number of bits and the fourth digital control value consists of a second number of bits less than the first number of bits.

* * * * *